(12) United States Patent
Brock et al.

(10) Patent No.: US 8,527,801 B2
(45) Date of Patent: Sep. 3, 2013

(54) PERFORMANCE CONTROL OF FREQUENCY-ADAPTING PROCESSORS BY VOLTAGE DOMAIN ADJUSTMENT

(75) Inventors: Bishop C. Brock, Coupland, TX (US); John B. Carter, Austin, TX (US); Alan J. Drake, Austin, TX (US); Michael S. Floyd, Cedar Park, TX (US); Charles R. Lefurgy, Austin, TX (US); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 12/827,432

(22) Filed: Jun. 30, 2010

(65) Prior Publication Data
US 2012/0005513 A1 Jan. 5, 2012

(51) Int. Cl.
*G06F 1/00* (2006.01)

(52) U.S. Cl.
USPC ............................................ 713/340; 702/61

(58) Field of Classification Search
USPC ................................... 713/300–340; 702/61
See application file for complete search history.

(56) References Cited

U.S. PATENT DOCUMENTS

| | | |
|---|---|---|
| 5,726,901 A | 3/1998 | Brown |
| 6,002,878 A | 12/1999 | Gehman et al. |
| 6,442,700 B1 | 8/2002 | Cooper |
| 6,513,124 B1 | 1/2003 | Furuichi et al. |
| 6,553,502 B1 | 4/2003 | Hurd et al. |
| 6,704,876 B1 | 3/2004 | Iacobovici et al. |
| 6,775,787 B2 | 8/2004 | Greene |
| 6,795,927 B1 | 9/2004 | Altmejd et al. |
| 6,795,928 B2 | 9/2004 | Bradley et al. |
| 6,816,809 B2 | 11/2004 | Circenis |
| 6,820,222 B2 | 11/2004 | Swoboda |
| 6,829,713 B2 | 12/2004 | Cooper et al. |
| 6,845,456 B1 | 1/2005 | Menezes et al. |
| 6,904,534 B2 | 6/2005 | Koenen |
| 7,017,060 B2 | 3/2006 | Therien et al. |
| 7,111,177 B1 | 9/2006 | Chauvel et al. |
| 7,272,517 B1 | 9/2007 | Brey et al. |
| 7,434,083 B1 | 10/2008 | Wilson |
| 7,576,569 B2 | 8/2009 | Carpenter et al. |
| 7,579,887 B1 | 8/2009 | Friedman et al. |
| 7,607,030 B2 | 10/2009 | Goodrum et al. |

(Continued)

OTHER PUBLICATIONS

Wang, et al., "Managing Peak System-Level Power with Feedback Control", IBM Research Report RC23835, Dec. 2005.

(Continued)

*Primary Examiner* — Clifford Knoll
(74) *Attorney, Agent, or Firm* — Mitch Harris, Atty at Law, LLC; Andrew M. Harris; Libby Z. Toub (57) ABSTRACT

A performance control technique for a processing system that includes one or more adaptively-clocked processor cores provides improved performance/power characteristics. An outer feedback loop adjusts the power supply voltage(s) provided to the power supply voltage domain(s) powering the core(s), which may be on a per-core basis or include multiple cores per voltage domain. The outer feedback loop operates to ensure that each core is meeting specified performance, while the cores also include an inner feedback loop that adjusts their processor clock or other performance control mechanism to maximize performance under present operating conditions and within a margin of safety. The performance of each core is measured and compared to a target performance. If the target performance is not met for each core in a voltage domain, the voltage is raised for the voltage domain until all cores meet the target performance.

25 Claims, 6 Drawing Sheets

Fig. 5

(56) References Cited

U.S. PATENT DOCUMENTS

| | | |
|---|---|---|
| 2002/0194509 A1 | 12/2002 | Plante et al. |
| 2002/0194517 A1 | 12/2002 | Cohen et al. |
| 2003/0065960 A1 | 4/2003 | Rusu et al. |
| 2003/0126479 A1 | 7/2003 | Burns et al. |
| 2004/0041538 A1 | 3/2004 | Sklovsky |
| 2004/0059956 A1 | 3/2004 | Chakravarthy et al. |
| 2004/0225902 A1 | 11/2004 | Cesare et al. |
| 2005/0049729 A1 | 3/2005 | Culbert et al. |
| 2005/0060594 A1 | 3/2005 | Barr et al. |
| 2005/0218871 A1 | 10/2005 | Kang et al. |
| 2005/0268189 A1 | 12/2005 | Soltis, Jr. |
| 2006/0129852 A1 | 6/2006 | Bonola et al. |
| 2006/0156042 A1 | 7/2006 | Desai et al. |
| 2006/0230299 A1 | 10/2006 | Zaretsky et al. |
| 2006/0253715 A1 | 11/2006 | Ghiasi et al. |
| 2006/0288241 A1 | 12/2006 | Felter et al. |
| 2006/0294400 A1 | 12/2006 | Diefenbaugh et al. |
| 2007/0016814 A1 | 1/2007 | Rusu et al. |
| 2007/0124094 A1 | 5/2007 | Brey et al. |
| 2008/0141047 A1 | 6/2008 | Riviere-Cazaux |
| 2008/0229127 A1 | 9/2008 | Felter et al. |
| 2009/0312848 A1 | 12/2009 | Anderson et al. |
| 2010/0017690 A1 | 1/2010 | Rylyakov et al. |

OTHER PUBLICATIONS

Weiser, et al.,"Scheduling for Reduced CPU Energy", "Proceedings of the First Symposium on Operating Systems Design and Implementation," Usenix Association Nov. 1994.

Bohrer, et al.: "The Case for Power Management in Web Servers", IBM Research, Austin TX, 2002.

Wu, et al., "Cycle-Accurate Macro-Models for RT-Level Power Analysis", IEEE Transactions on Very Large Scale Integration (VLSI) systems, vol. 6, No. 4, Dec. 1998, pp. 520-528.

PERFORMANCE CONTROL OF FREQUENCY-ADAPTING PROCESSORS BY VOLTAGE DOMAIN ADJUSTMENT

BACKGROUND OF THE INVENTION

1. Field of the Invention

The present invention is related to computer systems in which processor clock frequencies are adaptively adjusted in response to dynamic measurements of operating conditions, and in particular to a computer system in which power supply voltage domains are adjusted to cause an adaptive change in performance of the processors in the corresponding voltage domains.

2. Description of Related Art

In recent computer systems, processor cores provide adaptive adjustment of their performance, e.g., by adjusting processor clock frequency, so that higher operating frequencies can be achieved, under most operating conditions and with most production processors, than could be otherwise specified. A specified maximum operating frequency for a given power supply voltage, and similarly a specified minimum power supply voltage for a given operating frequency, are necessarily conservative due to variable operating ranges of temperature and voltage and also ranges of manufacturing process variation for the particular device, i.e., the processor integrated circuit (IC). Workload differences also contribute to the need to provide operating margins for fail-safe operation, as the local voltage and temperatures at particular processor cores and particular locations within each processor core can vary depending on the particular program code being executed, and particular data or other input being processed. However, with an adaptive adjustment scheme, the effects of process, temperature and voltage can be taken into account, permitting much less conservative operation than would be possible in a fixed clocking scheme.

One technique for adaptive adjustment of processor core clock frequency uses periodic measurements of propagation delay of one or more circuits that synthesize a critical signal path in the processor core. The critical path is a signal path that is determinative of the maximum operating frequency of the processor core under the instant operating conditions, i.e., the critical path is the signal path that will cause operating failure should the processor clock frequency be increased beyond an absolute maximum frequency for the instant operating conditions. The critical path may change under differing operating conditions, e.g., with temperature changes or with power supply voltage changes or with workload changes. Therefore, the critical path monitoring circuits (CPMs) as described above generally include some flexibility in the simulation/synthesis of the critical path delay, as well as computational ability to combine the results of simpler delay components to yield a result for a more complex and typically longer, critical path. Other techniques include using ring oscillators to determine the effects of environmental factors and process on circuit delay. Once the critical path delay is known for the present temperature and power supply voltage, the processor clock frequency can be increased to take advantage of any available headroom. In one implementation, multiple CPMs distributed around the processor IC die provide information to a clock generator within the processor IC that uses a digital phase-lock loop (DPLL) to generate the processor clock. The combined information allows the clock generator to adaptively adjust the processor clock to the instant operating conditions of the processor IC, which is further adapted to the processor IC's own characteristics due to process variation.

Other techniques that may be used for processor frequency adjustment under dynamic operating conditions may use extrinsic environmental information to set the processor clock frequency, e.g., the temperature and power supply voltage within or without the processor IC die, to estimate the maximum processor frequency, rather than the more direct approach of measuring delay of a synthesized critical path. While the extrinsic measurements do not typically account for process variation, a significant performance advantage can still be realized by compensating for temperature and voltage variation, especially for processor ICs in which manufacturing process variation has a relatively minor impact on clock frequency. Further, other throttling mechanisms, such as adjusting the instruction dispatch, fetch or decode rates of the processor cores can be used to adjust the effective processor clock frequency, and thereby adapt the operating performance/power level of a processor in conformity with environmental measurements.

Once a system is implemented using adaptively-clocked processors, such as those described above, the individual frequencies of the processor cores will necessarily vary within the system and will be distributed according to their local power supply voltage, temperatures, process characteristics of the individual processors, and workloads being executed, to achieve the maximum performance available while maintaining some safety margin. Such operation is not necessarily desirable. For example, in distributed computing applications that serve multiple computing resource customers, such as virtual machines hosting web servers or other cloud computing applications, the frequency of the processor clock or other measure of performance of one or more cores assigned to particular virtual machines may be specified as an absolute minimum, and falling below the specified performance level cannot be permitted. Exceeding the specified performance by too great a margin is also undesirable, as such operation typically wastes power. Further, in some applications, accounting of processor usage may be tied to the processor clock frequency or other performance level metric, which could cause a higher charge for a processor operating at a frequency exceeding a specified operating frequency for a customer's requirements.

Therefore, it would be desirable to provide a control method and system that controls processor performance in a system that has one or more processors individually clocked by an environmentally-adaptive clocking scheme.

BRIEF SUMMARY OF THE INVENTION

The invention is embodied in a method, a computer program product and a computer system, in which the performance of an individual processor core or group of processor cores within a voltage domain is adjusted to obtain a target minimum performance by varying the power supply voltage for the domain according to an outer feedback loop. The processor cores have inner feedback loops that adjust their processor clock frequencies, or other performance control mechanism such as instruction issue rate, to maximize performance under a current set of operating conditions, while maintaining a margin of safety. The computer program product includes program instructions for carrying out the method and the computer system is a system that is managed according to the method.

The method periodically measures the performance of one or more individual cores. Then the performance is compared to a target performance to obtain a performance deviation. The power supply voltages for the voltage domains powering the core(s) are then adjusted to ensure that all cores in each voltage domain are meeting their target performance. The performance measure may be processor clock frequency, or another performance metric such as instruction dispatch/completion rate. The performance measuring may measure an average frequency or other performance metric over a measurement interval, and the method may further estimate required power supply voltages from the computed frequency or other performance metric deviations. Alternatively, the method may adjust the power supply voltages in small increments until the target performance is reached for the cores.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses techniques for improving power efficiency in processing systems having multiple cores. The cores are cores that each adapt a performance control, such as processor frequency or instruction dispatch rate, to maximize performance within the limits of fail-safe operation according to an inner feedback loop, as determined by an environmental and process monitoring circuit such as a critical path monitor (CPM). The performance of the cores are controlled by an outer feedback loop that determines whether target performances levels are being met by all of the processors in a given voltage domain and if one or more of the processors is not meeting its corresponding target performance level, then the power supply voltage supplied to the given voltage domain is increased. Otherwise, if all of the processor cores in a voltage domain are exceeding their target performance level, the voltage supplied to the voltage domain can be decreased, conserving energy.

Figure 1:
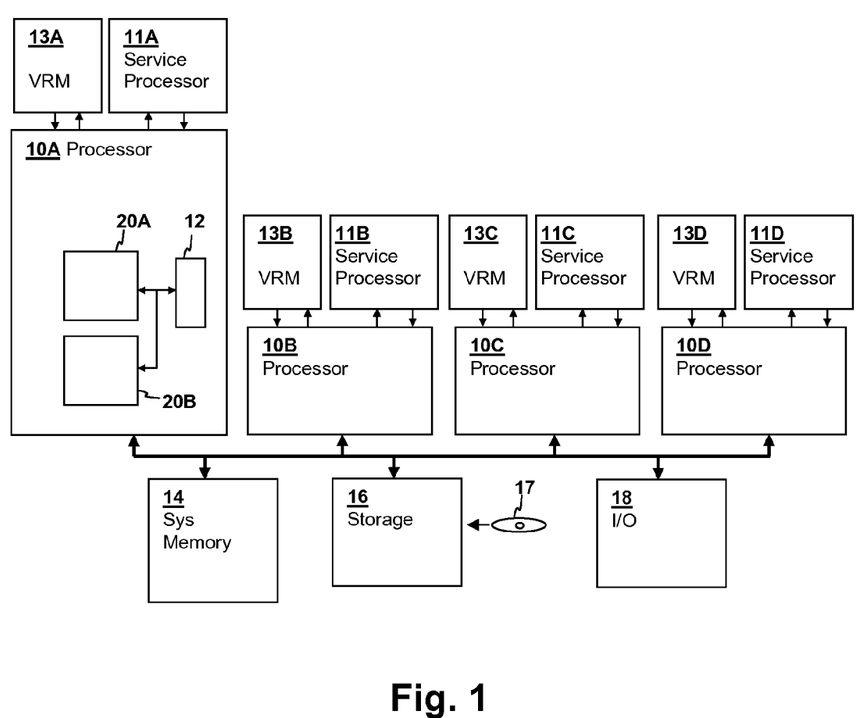
FIG. 1 is a block diagram illustrating a computer system including in which techniques according to an embodiment of the present invention are practiced.

Referring now to FIG. 1, a processing system in accordance with an embodiment of the present invention is shown. The depicted processing system includes a number of simultaneous multi-threading (SMT) processors 10A-10D, each having adaptive performance controlled according to an embodiment of the present invention. The depicted multi-processing system is illustrative, and processing system in accordance with other embodiments of the present invention will have different configurations, including single-threaded processing systems and uni-processor systems. Processors 10A-10D are identical in structure and include cores 20A-20B and local storage 12, which may be a cache level, or a level of internal system memory. Processors 10A-10D are coupled to main system memory 14, a storage subsystem 16, which includes non-removable drives and optical drives, for reading media such as a CD-ROM 17 for loading program code for execution by processors 10A-10D. The illustrated processing system also includes input/output (I/O) interfaces and devices 18 such as mice and keyboards for receiving user input and graphical displays for displaying information. While the system of FIG. 1 is used to provide an illustration of a system in which the performance control methodology of the present invention is implemented, it is understood that techniques of the present invention can be implemented in other architectures and that the present invention applies to other SMT processors in accordance with embodiments of the present invention that may be used in a variety of system architectures.

The system of FIG. 1 provides power supply voltages to processors 10A-10D from corresponding voltage regulator modules (VRMs) 13A-13D. The output voltages of VRMs 13A-13D are programmable, so that different voltages can be supplied to each of processors 10A-10D. Corresponding service processors 11A-11D provide information for controlling corresponding VRMs 13A-13D, among other real-time control functions, and in the present embodiment execute program instructions that provide a portion of an outer feedback loop that controls at least some of the power supply voltages provided to processors 10A-10D, in order to control the performance levels of cores 20A-20B within processors 10A-10D. In practice, in the exemplary embodiment, service processors 11A-11D communicate feedback information to one or both of cores 20A-20B within processors 10A-10D via a serial service processor bus. Processors 10A-10D, control VRMs 13A-13D via commands using the received feedback information. However, other communication schemes are envisioned, and the control could be performed by a process executing within one or both of cores 20A-20B or another processor logic integrated within processors 10A-10D.

In the depicted example, each of processors 10A-10D represents a single voltage domain for the power supply distribution scheme, although each of processors 10A-10D receives three power supply voltages $V_{DD}$, $V_{IO}$ and $V_{CS}$, power supply voltages $V_{DD}$ and $V_{CS}$ are controlled together and represent a single voltage domain for the purposes of the present illustration and power supply voltage $V_{IO}$ is not controlled by the outer feedback loop. Power supply voltage $V_{IO}$ is representative of a power supply voltage that provides a small fraction of the overall power consumption of processors 10A-10D, a power supply voltage for which performance is not a strongly dependent function, a power supply voltage for which performance is not characterized, and/or a power supply voltage that cannot be varied due to interface constraints. Service processors 11A-11D also obtains performance information from cores 20A-20B within each of processors 10A-10D via a service processor interface and also receives target performance levels for cores 20A-20B within each of processors 10A-10D from the system, which are used to determine the voltages generated by VRMs 13A-13D according to the outer feedback loop. While the illustrated system shows a core-to-voltage-domain relationship of 2:1, the voltage domains can be per-core, or may encompass larger numbers of cores. The closer the core-to-voltage-domain relationship is to per-core, the more efficient the system using the illustrated techniques, because when the voltage to each core can be controlled independently, the voltage at each core can be set to the optimum value. Otherwise, some cores within a voltage domain may receive a higher voltage than necessary to achieve their performance targets because some other core(s) in the voltage domain requires the voltage level being demanded by the outer feedback loop.

Figure 2A:
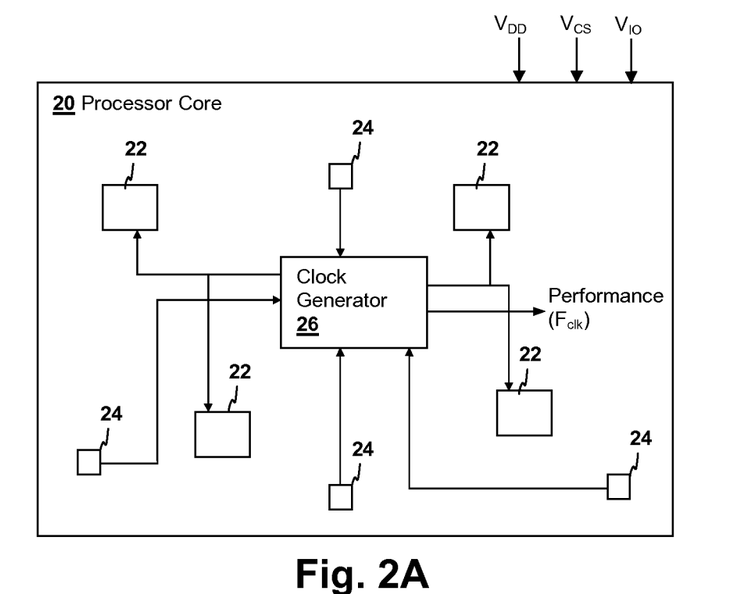
FIGS. 2A-2B are simplified block diagrams of, processor cores 20 and 30, respectively, that may be used to implement cores 20A-20B in the computer system of FIG. 1 in accordance with different embodiments of the present invention.

Referring now to FIG. 2A, details of a processor core 20 that may be used to implement processor cores 20A-20B of FIG. 1 are shown, in accordance with an embodiment of the present invention. Within processor core 20, multiple CPMs 24 are distributed around the die on which processor core 20 is integrated. The distribution of CPMs around the die permits measuring path delays in accordance with local variations in power supply voltage and temperature within the die, which are then indicative of path delays in functional logic blocks 22, that implement the processing and storage circuits of processor core 20. In particular, for a given set of processing circuits, operating environment and workload, there is a critical delay path that is determinative of the maximum clock frequency that can be provided to the processing circuits without causing a failure due to set-up violations or other timing violations that lead to invalid operation and/or logic values within processor core 20. CPMs that may be used to implement ICs in accordance with embodiments of the invention are disclosed in U.S. Pat. No. 7,576,569, the disclosure of which is incorporated herein by reference.

A clock generator 26 provides an internal clock source for processor core 20, generally using a digital phase-lock loop (DPLL) that multiplies an externally-supplied lower-frequency clock signal by a large factor. In processor core 20, the output processor clock frequency generated by clock generator 26 is controlled by the outputs of CPMs 24 so that fail-safe operation is ensured. CPMs 24 provide a very rapid inner control loop feedback that compensate for rapid drops in power supply voltage due to workload increases, along with rises in temperature, so that fail-safe operation is maintained with a much lower frequency margin, and therefore a higher clock frequency and performance level, than would otherwise be required to ensure fail-safe operation. A workload is a set of instructions executed by processor core 20 and a rate of execution of those instructions, and may include particular data operated on by those instructions, in which the instruction/data mix causes a particular demand for the resources of processor core 20 and their rate of demand, that will vary from workload to workload. While the details of CPMs 24 are as illustrated further below with reference to FIG. 3, alternative circuits can be used to provide feedback for performance level controls such as ring oscillators that provide process, voltage and temperature (PVT) information or direct indications of expected critical path delay. Further, critical path delay can estimated from other circuits that can measure PVT information so that performance can be controlled as described above. Details of DPLL control that can be used to provide an inner feedback loop in an IC in accordance with an embodiment of the invention are described in U.S. Pat. No. 7,579,887 and U.S. Patent Application Publication U.S. 20090312848, the disclosures of which are incorporated herein by reference. Digitally-controlled oscillators that may be used in a clock generator of an IC according to an embodiment of the present invention are disclosed in U.S. Patent Application Publication U.S. 20100017690, which is also incorporated herein by reference.

Figure 2B:
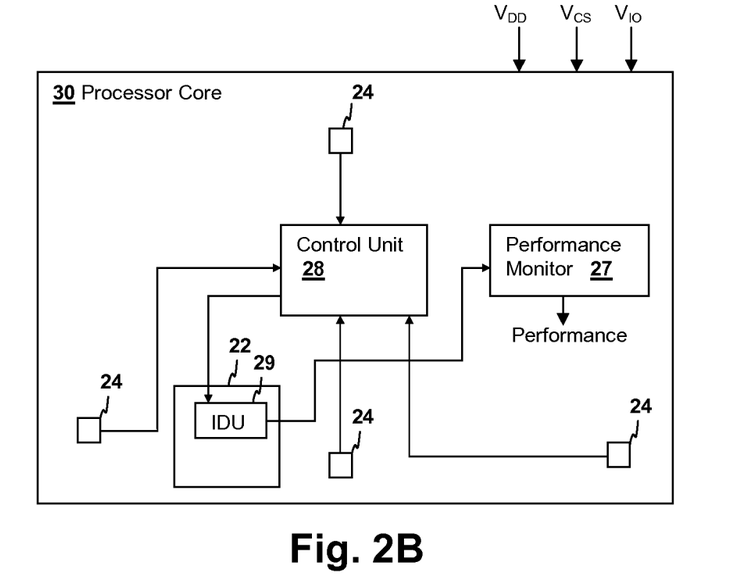

Referring now to FIG. 2B, details of a processor core 30 that may be used to implement processor cores 20A-20B of FIG. 1 are shown, in accordance with another embodiment of the present invention. Processor core 30 is similar to processor core 20 of FIG. 2A, so only differences between them will be described below. Within processor core 30, the multiple CPMs 24 provide critical path delay information to a control unit 28 that generates an output control signal that is used within functional block 22 to control an instruction dispatch unit (IDU) 29, so that rather than controlling processor clock frequency as in processor core 20 of FIG. 2A, a rate of instruction dispatches is controlled. When the performance of processor core 30 needs to be reduced to maintain safe operation, reducing the rate of instruction execution accomplishes a similar result as reducing the clock frequency, since the voltage drop through the power supply distribution network and the temperature of the die are dependent on the rate of instruction execution. The throttling of processor instruction execution by controlling IDU 29 is only one possibility for controlling the rate of instruction execution, and techniques according to alternative embodiments of the present invention include throttling pre-fetches, controlling the rate of instruction decodes and other techniques that produce a similar control of the throughput of the pipelines within processor core 30. Further, while the performance values needed by the outer control loop, as will be described in detail below, are available in processor core 20 of FIG. 2A as the frequency set by clock generator 26, in processor core 30, a performance monitor 27 that counts a rate of instruction completions, dispatches, fetches or other metric provides the performance value used by the outer control loop.

Figure 3:
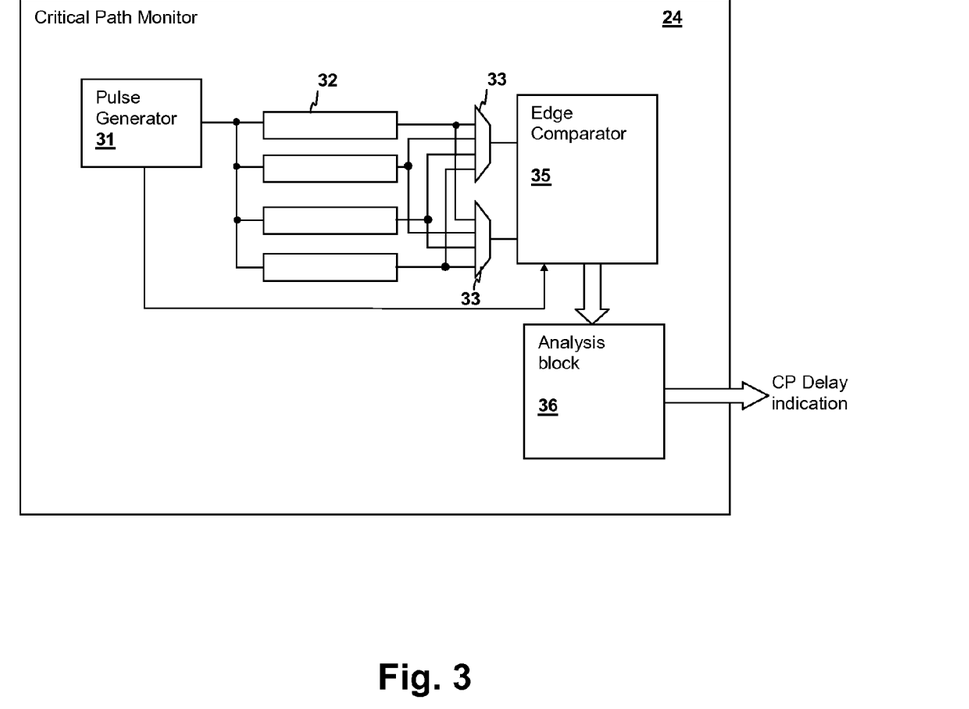
FIG. 3 is a block diagram showing details of critical path monitoring circuits 24 within processor core 20 of FIG. 2.

Referring now to FIG. 3, details of CPMs 24 are shown in accordance with an embodiment of the present invention. A pulse generator 31 provides pulses to inputs of a set of delay lines 32 that represent different circuit delay types, e.g., wire delay, NOR gate delay, NAND gate delay, pass gate delay, adder delay, and may include others so that portions of circuits having different delay vs. PVT slopes can be synthesized. A pair of multiplexers 33 select from two of the delay lines 32 and an edge comparator 35 determines relative delay between the two selected delay lines 32. An analysis block 36 then generates control information that is provided to clock generator 26 of core 20 in FIG. 2A or to IDU 29 of core 30 in FIG. 2B, to or another circuit within the core that can control performance of the core. The control information is an indication of critical path delay within the core for the particular area of the die on which CPM 24 is integrated.

Figure 4:
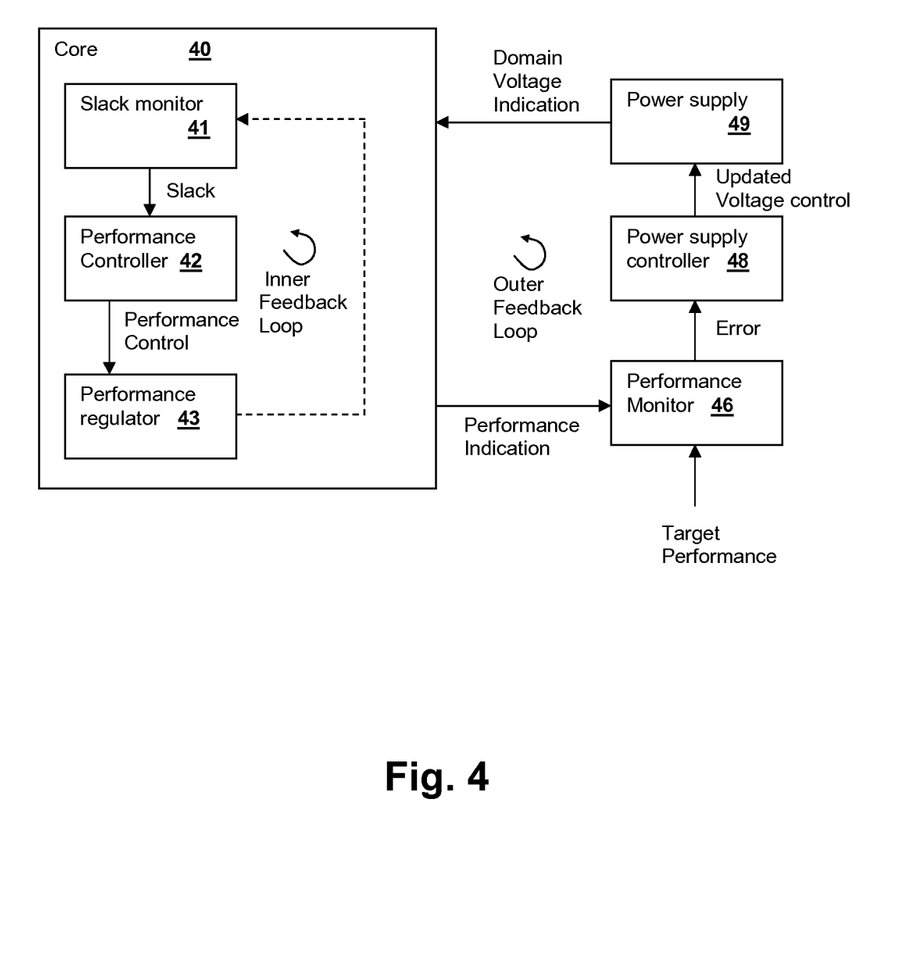
FIG. 4 is a pictorial diagram depicting information flow in a system in accordance with an embodiment of the present invention.

Referring now to FIG. 4, control and information flow within a computer system in accordance with an embodiment of the present invention is shown. Within processor core 40, an inner feedback loop is provided by a slack monitor 41, which may be implemented by a CPM 24 as illustrated above, that provides a measure of the performance slack available in processor core 40. The slack may be the difference between the frequency at which processor core 40 is operating and the frequency at which processor core 40 would exceed fail-safe operation, or may be a difference between a rate of instruction dispatches in processor core 40 and the rate at which fail-safe operation would be exceeded, or other indication of the amount of additional performance is available within the bounds of fail-safe operation. For example, the slack value may be the critical path delay indication provided by one of CPMs 24 of FIG. 3. The slack value is provided to a performance controller 42 that determines a performance control value, which is applied to a performance regulator 43, for example performance controller 42 may determine a new operating frequency or a new dispatch rate from the slack value provided by slack monitor 41. The new performance control value is then used to control the performance regulator 43, which may be clock generator 26 in core 20 of FIG. 2A, IDU 29 in core 30 of FIG. 2B, or another suitable regulator of performance. The change in the performance made by the performance regulator 43 results in a change in the performance slack, closing the inner feedback loop. The above-described inner feedback loop operation acts to maximize performance of each core 40 within the limits of safe operation, but does not independently set performance levels of the cores 40 within the system.

The setting of performance levels of cores 40 (or single core 40) within the system is performed by the outer feedback loop illustrated in FIG. 4, which controls the domain voltage provided to core 40 from a power supply 49 (e.g., VRMs 13A-13D of FIG. 1). A performance indication is provided from core 40, e.g., an indication of the clock frequency set by clock generator 26 in core 20 of FIG. 2A, the output of performance monitor 27 in core 30 of FIG. 2B, or another performance indicator that indicates the performance level actually set in core 40 by the inner feedback loop in response to the presently-set domain voltage. A performance monitor 46 then computes the performance error, i.e., the difference between the obtained performance provided by the performance indication and a target performance specified by the system. The error is provided to a power supply controller 48 that computes an updated power supply control value that is provided to power supply 49, closing the outer feedback loop. The performance indicator is generally an average value, e.g., average frequency, average instruction rate, in order to provide a more stable and less noisy rate of control from outer feedback loop. The update of the power supply control value can be performed by increment/decrement operations at the resolution of the voltage control per iteration of the outer control loop, providing a slowly converging control response. Alternatively, a proportional controller can be implemented by obtaining an empirical constant k that relates the slope of power supply voltage to a change in performance, e.g., $k=\Delta v/\Delta f$ where $\Delta v$ is a predetermined change in voltage and $\Delta f$ is a consequent change in processor frequency between two frequencies surrounding the present average frequency. A table of k values can be used to provide a finer model of voltage/frequency relationships across the entire operating range of core 40. Another performance figure can be substituted for frequency and yield a similar control model. So for example, an updated voltage control value $V_U$ can be computed according to $V_U=V_{present}+k*(F_{target}-F_{average})$, where $F_{target}$ is a specified target processor core frequency, $F_{average}$ is the present average clock frequency of the core and $V_{present}$ is the present domain power supply voltage. Changes in updated control value $V_U$ can be further limited to a maximum step size, to ensure that large frequency deviation steps do not cause unstable operation, i.e., changes in voltage that can cause operational failure of core 40, before the inner control loop can act to adjust the operating frequency of core 40. While the above-described techniques (increment/decrement or proportional) provide control algorithms suitable for operating a computer system in accordance with embodiments of the present invention, other control methodologies can be applied according to the needs of the system and the response of the various components. Further, while the feedback loops are illustrated in the above equations (or increment/decrement scheme) as linear expressions, in practice, limits on the frequency range and power supply voltage ranges applied to the cores will generally be imposed to ensure that practical operating ranges are not exceeded.

Figure 5:
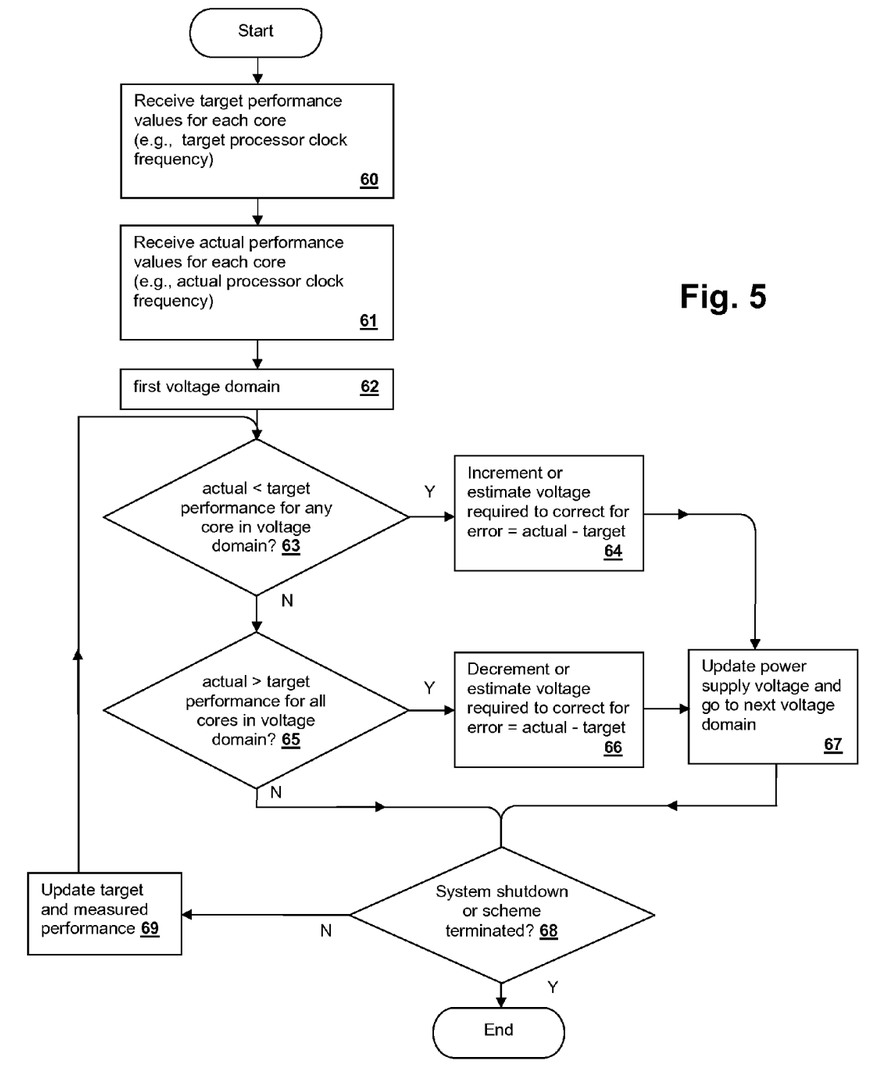
FIG. 5 is a flow chart of a method as performed in a computer system accordance with an embodiment of the present invention.

Referring now to FIG. 5, a performance management method, in accordance with an embodiment of the invention, is depicted in a flowchart. Target performance values, e.g., specified clock frequency, millions of instructions-per-second (MIPS), or other such values, are received from the system for each core (step 60). The actual performance values are received from the cores (step 61) and the method proceeds to control the first voltage domain (step 62). If any of the cores in the domain have an actual performance below their corresponding target performance (decision 63), then the voltage control value is incremented, or the required voltage to produce the desired performance is computed to correct for the performance error (step 64). Otherwise, if all of the cores in the domain have an actual performance above their corresponding target performance (decision 65), then the voltage control value is decremented, or the required voltage to produce the desired performance is computed to correct for the performance error (step 66). The power supply control value in the power supply circuits is updated (step 67), which will cause the cores to assume new performance levels, and the method moves on to the next voltage domain. Until the system is shut down or the scheme is terminated (decision 68), steps 63-68 are repeated with updated target and measured performance values (decision 69). Before repeating the process of steps 63-68, it may be necessary or desirable to check to ensure that all voltage updates have been actuated, since updating the loop at rates approaching the power supply update rate may cause erroneous operation.

Figure 6:
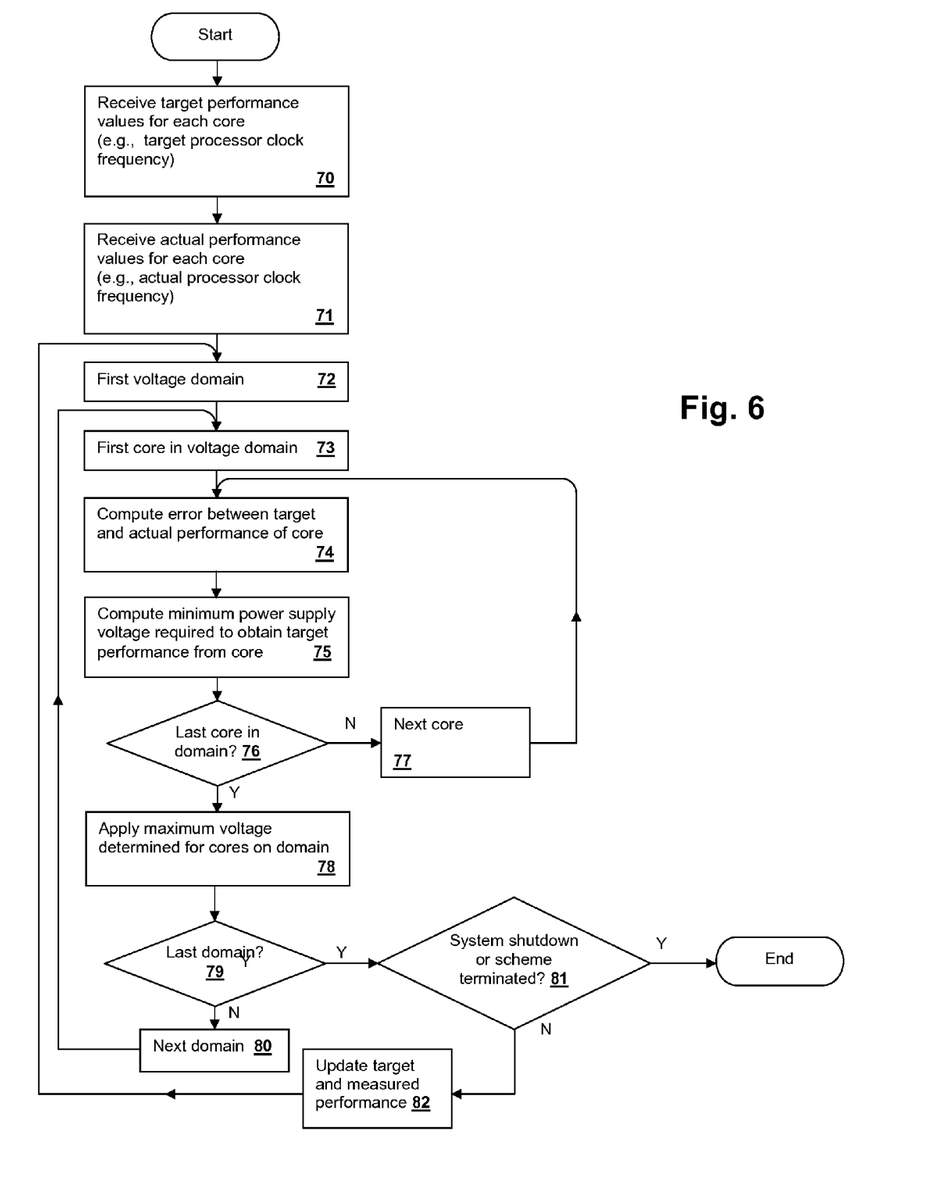
FIG. 6 is a flow chart of a method as performed in a computer system accordance with another embodiment of the present invention.

Referring now to FIG. 6, a performance management method, in accordance with another embodiment of the invention, is depicted in a flowchart. Target performance values, e.g., specified clock frequency, millions of instructions-per-second (MIPS), or other such values, are received from the system for each core (step 70). The actual performance values are received from the cores (step 71) and the method proceeds to control the first voltage domain (step 72) and the first core of the current voltage domain (step 73). In contrast to the method depicted in FIG. 5, the method of FIG. 6 proceeds to calculate a performance error value, e.g., the difference between a target frequency for the current core and the actual core frequency (step 74). Then, the minimum power supply voltage required to achieve the target frequency on the current core is computed (step 75) and steps 74 and 75 are repeated for the next core (step 77) until the last core in the voltage domain has been reached (decision 76). After all of the cores in a voltage domain have been analyzed (decision 76), the maximum voltage determined from all of the cores is applied to the voltage domain (step 78), which may be limited according to the size of the change in the domain power supply voltage as noted above in order to prevent too large a change from causing failure of a core. The result is that each computed positive change in power supply voltage represents a determination that the performance, e.g., clock frequency, of the processor core needs to be increased. If there is no positive change voltage, i.e., all of the processor cores have been determined to be at or above the target performance level, then the maximum negative change, i.e., the smallest negative change, will be applied to the power supply voltage, which will result in a decrease in power supply voltage because there is performance slack that can be used by the system. Until the last domain has been reached (decision 79), the method proceeds to treat the next voltage domain (step 80), repeating steps 73-79 and until the scheme is terminated or the system is shutdown (decision 81), the entire process repeats from step 72 with updated target and measured performance values (step 82). Before repeating the process of steps 73-79, it may be necessary or desirable to check to ensure that all voltage updates have been actuated, since updating the loop at rates approaching the power supply update rate may cause erroneous operation.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of managing energy consumption and performance in a computer system having at least one processor core, the method comprising:
    at the processor core, determining whether a performance control of the processor core can be increased;
    responsive to determining that the performance control can be increased, increasing the performance control according to an inner feedback loop of the processor core;
    at the processor core, determining whether the performance control of the processor core should be decreased;
    responsive to determining that the performance control of the processor core should be decreased, decreasing the performance control according to the inner feedback loop;
    determining whether or not a performance measure at the processor core has met a target performance values; and
    responsive to determining that the processor core has not met the target performance value, increasing a power supply voltage of a voltage domain supplying the processor core according to an outer feedback loop.

2. The method of claim 1, wherein the method further comprises:
    determining whether the performance measure exceed the target performance value; and
    responsive to determining that the performance measure exceeds the target performance value, decreasing a power supply voltage of the voltage domain according to the outer feedback loop.

3. The method of claim 1, wherein the at least one processor core comprises multiple processor cores, wherein the determining whether the performance control can be increased, the increasing the performance control, the determining whether the performance control should be decreased and the decreasing the performance control are performed for each of the processor cores independently according to corresponding inner feedback loops of the processor cores.

4. The method of claim 3, and wherein the method further comprises:
    determining whether performance measures at all of the processor cores supplied by a given voltage domain exceed corresponding target performance values; and
    responsive to determining that performance measures at all of the processor cores supplied by the given voltage domain exceed corresponding target performance values, decreasing a power supply voltage of the given voltage domain according to the outer feedback loop.

5. The method of claim 1, wherein the determining whether the performance control of the processor core can be increased determines whether the performance control of the processor core can be increased while maintaining fail-safe operation of the processor core, and wherein the determining whether the performance control of the processor core should be decreased determines whether the performance control of the processor core should be decreased to maintain fail-safe operation of the processor core.

6. The method of claim 5, wherein a rate of the determining whether the performance control of the processor core should be decreased to maintain fail-safe operation and the decreasing the performance control of the processor core according to the inner feedback loop is substantially faster than a rate of control of the outer feedback loop such that if the decreasing the power supply voltage of the given voltage domain decreases the power supply voltage such that fail-safe operation of the processor core is compromised, the inner feedback loop will act to decrease the performance control of the processor core.

7. The method of claim 5, wherein a rate of the determining whether the performance control of the processor core should be decreased to maintain fail-safe operation and the decreasing the performance control of the processor core according to the inner feedback loop is substantially faster than a rate of control of the outer feedback loop such that changes in a workload executed by the processor core causes fail-safe operation of the marginal processor core to be compromised, the inner feedback loop will act to decrease the performance control of the processor core.

8. The method of claim 1, wherein the performance measure is an observed processor clock frequency of the processor core, and wherein the determining whether a performance measure at the processor core has met the target performance value comprises computing a difference between a specified target frequency and the observed processor clock frequency.

9. The method of claim 1, wherein the performance measure is an indicator of a rate of processor instruction completions, and wherein the determining whether the performance measure at the processor core has met the target performance value comprises computing a difference between a specified rate for the indicator and the value of the indicator.

10. The method of claim 1, wherein the performance control is a clock frequency of the processor core.

11. The method of claim 1, wherein the performance control controls corresponding rates of instruction execution within the processor core independent of a clock frequency of the processor core.

12. A computer system including comprising:
    at least one processor core for executing program instructions including a performance margin monitor for determining whether a performance control of the processor core can be increased or should be decreased, wherein the processor core includes a performance controller implementing a portion of an inner feedback loop that increases the performance control of the processor core in response to determining that the performance of the processor core can be increased and decreases the performance control of the processor core in response to determining that the performance control should be decreased;
    at least one programmable power supply for supplying a power supply voltage to the processor core; and
    a power supply controller that receives a performance measure indicative of whether or not a performance of the processor core has met a target performance value, wherein the power supply controller, in response to determining that the processor core has not met the target performance value, increases the power supply voltage of the programmable power supply, whereby the power supply controller implements a portion of an outer feedback loop.

13. The computer system of claim 12, wherein the at least one programmable power supply comprises multiple programmable power supplies, wherein the at least one processor core comprises multiple processor cores having corresponding performance margin monitors and performance controllers for adjusting the performance controls of the processors independently according to corresponding inner feedback loops of the processor cores, and wherein the power supply controller receives performance measures for each of the processor cores and controls a corresponding power supply voltage of a corresponding one of the multiple programmable power supplies in response to determining that a corresponding performance measure of one of the multiple processor cores has not met a corresponding one of multiple target performance values.

14. The computer system of claim 13, wherein the power supply controller further determines whether performance measures at all of the processor cores supplied by a given voltage domain exceed corresponding target performance values, and responsive to determining that performance measures at all of the processor cores supplied by the given voltage domain exceed corresponding target performance values, controls a given one of the multiple programmable power supplies associated with the given voltage domain to decrease a power supply voltage of the given voltage domain according to the outer feedback loop.

15. The computer system of claim 12, wherein the performance margin monitor determines whether the performance control can be increased while maintain fail-safe operation of the processor core and determines whether the performance control should be decreased to maintain fail-safe operation of the processor core.

16. The computer system of claim 15, wherein an update rate of the performance controller is substantially faster than an update rate of the power supply controller such that if the decreasing of the power supply voltage of the programmable power supply decreases the power supply voltage such that fail-safe operation of a the processor core is compromised, the inner feedback loop will act to decrease the performance control of the processor core.

17. The computer system of claim 15, wherein an update rate of the performance controller is substantially faster than an update rate of the power supply controller such that changes in a workload executed by the processor core causes fail-safe operation of the processor core to be compromised, the inner feedback loop will act to decrease the performance control of the processor core.

18. The computer system of claim 12, wherein the performance measures is an observed processor clock frequency of the processor core, and wherein the power supply controller determines whether the performance measure has met the target performance value by computing a difference between a specified target frequency and the observed processor clock frequency.

19. The computer system of claim 12, wherein the performance measure is an indicator of a rate of processor instruction completions, and wherein the power supply controller determines whether the performance measure has met the target performance value by computing a difference between a specified rate for the indicator and a value of the indicator.

20. The computer system of claim 12, wherein the performance control is a clock frequency of the processor core.

21. The computer system of claim 12, wherein the performance controller controls a rate of instruction execution within the processor core independent of a clock frequency of the processor core.

22. A computer program product comprising a computer-readable storage media storing program instructions for execution by a processor within a computer system, wherein the program instructions are program instructions for controlling a programmable power supply that supplies a processor core, wherein the processor core is a processor core that automatically adapts a performance control to maximize performance according to an inner feedback loop, and wherein the program instructions comprise program instructions implementing a portion of an outer feedback loop, the program instructions comprising program instructions for:
determining whether or not the processor core has met a target performance value; and
responsive to determining that the processor core has not met the corresponding target performance value, controlling the programmable power supply to increase the power supply voltage supplied to the processor core.

23. The computer program product of claim 22, wherein the computer system includes multiple processor cores and multiple programmable power supplies for supplying multiple voltage domains each providing a corresponding power supply voltage to one or more of the processor cores, wherein the program instructions for determining determine whether the processor cores have met corresponding ones of multiple target performance values, and wherein the program instructions for controlling control a corresponding one of the multiple programmable power supplies to increase the corresponding power supply voltage in response to determining that the processor core has not met the corresponding target performance value.

24. The computer program product of claim 23, wherein the program instructions further comprise program instructions for:
determining whether the performance measures at all of the processor cores supplied by a given one of the voltage domains exceed the corresponding target performance values; and
responsive to determining that performance measures at all of the processor cores supplied by the given voltage domain exceed corresponding target performance values, controlling a corresponding one of the multiple programmable power supplies to decrease a power supply voltage of the given voltage domain according to the outer feedback loop.

25. The computer program product of claim 22, wherein an update rate of the controlling is substantially slower than an update rate of the inner feedback loop such that if the controlling decreases the power supply voltage or changes occur in a workload executed by the processor core such that fail-safe operation of the processor core is compromised, the inner feedback loop will act to decrease the performance control of the marginal processor core.

* * * * *